United States Patent
Ikuma et al.

(10) Patent No.: US 12,124,086 B2
(45) Date of Patent: Oct. 22, 2024

(54) OPTICAL FIBER CONNECTION STRUCTURE

(71) Applicant: Nippon Telegraph and Telephone Corporation, Tokyo (JP)

(72) Inventors: Yuichiro Ikuma, Musashino (JP); Yusuke Nasu, Musashino (JP); Takashi Yamada, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 249 days.

(21) Appl. No.: 17/779,045

(22) PCT Filed: Nov. 28, 2019

(86) PCT No.: PCT/JP2019/046637
§ 371 (c)(1),
(2) Date: May 23, 2022

(87) PCT Pub. No.: WO2021/106163
PCT Pub. Date: Jun. 3, 2021

(65) Prior Publication Data
US 2022/0413223 A1    Dec. 29, 2022

(51) Int. Cl.
G02B 6/30    (2006.01)
G02B 6/36    (2006.01)

(52) U.S. Cl.
CPC ............. *G02B 6/30* (2013.01); *G02B 6/3636* (2013.01)

(58) Field of Classification Search
CPC ...... G02B 6/30; G02B 6/1223; G02B 6/3636; G02B 2006/12038; G02B 2006/12061
See application file for complete search history.

(56) References Cited

U.S. PATENT DOCUMENTS

| | | | | |
|---|---|---|---|---|
| 5,737,138 A | * | 4/1998 | Someno | .............. G02B 6/30 385/83 |
| 2005/0129380 A1 | * | 6/2005 | Takeuchi | ........... C03C 10/0027 385/137 |

FOREIGN PATENT DOCUMENTS

| | | |
|---|---|---|
| JP | H09-54222 A | 2/1997 |
| JP | H11-305058 A | 11/1999 |
| JP | 2001-228345 A | 8/2001 |
| JP | 2003-337245 A | 11/2003 |
| JP | 2004-245853 A | 9/2004 |

* cited by examiner

*Primary Examiner* — Michael P Mooney
(74) *Attorney, Agent, or Firm* — Workman Nydegger

(57) ABSTRACT

An optical fiber array includes a V-groove substrate in which a V-groove for optical fiber alignment is formed, a pressing plate laminated and bonded on the V-groove substrate, and an optical fiber bonded and fixed in the V-groove of the V-groove substrate, wherein a distance between the optical fiber and the V-groove is less than 20 μm.

4 Claims, 7 Drawing Sheets

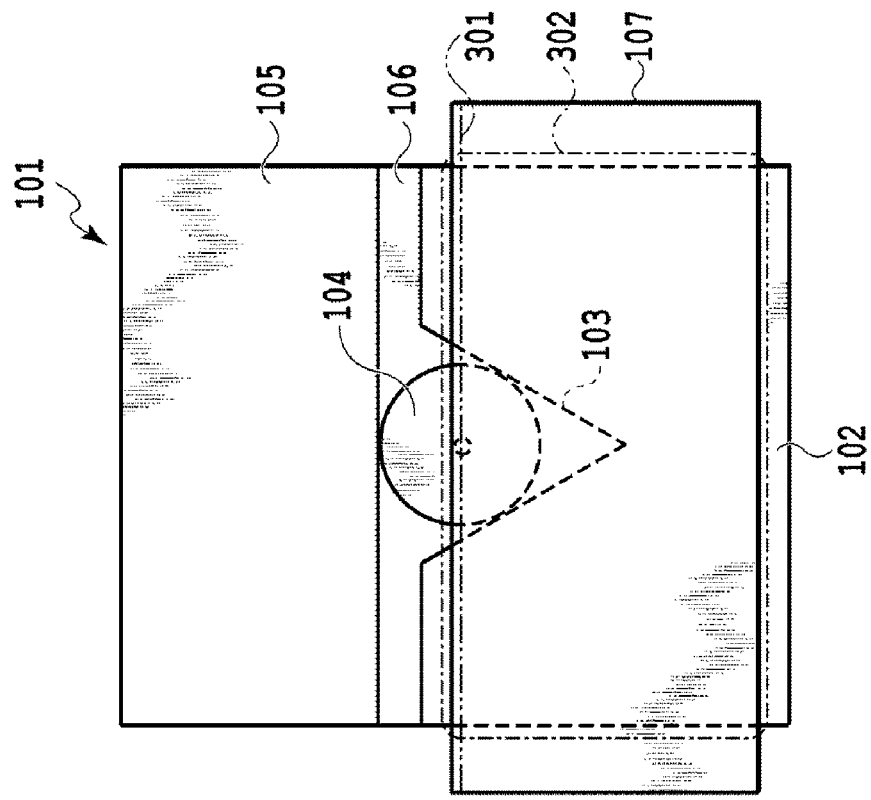
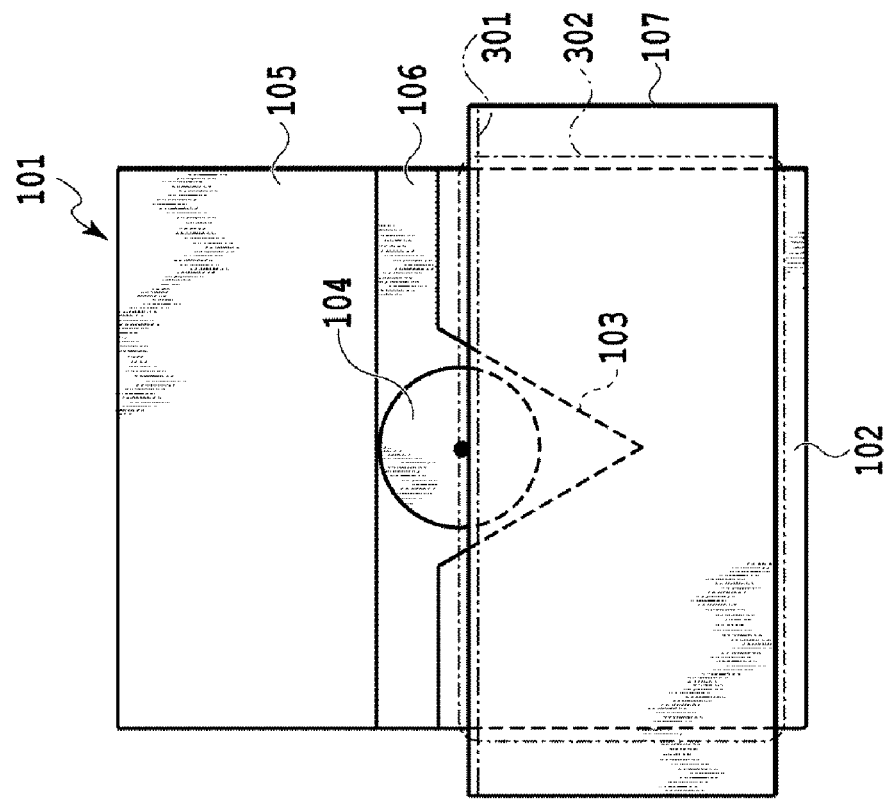
Fig. 3

OPTICAL FIBER CONNECTION STRUCTURE

TECHNICAL FIELD

The present invention relates to an optical fiber array in which core end surfaces of a plurality of optical fibers are aligned and disposed with a predetermined core pitch.

BACKGROUND ART

Smaller and more advanced optical modules have been actively researched and developed to increase a communication capacity per device of optical communication devices. Examples of promising technologies for this purpose include silicon photonics (SiP) technology.

SiP technology is a technique for optical circuits using silicon (Si) as a core material and silica glass ($SiO_2$) as a cladding material. Hereinafter, when referring to the optical waveguide of an optical circuit, it is referred to as a Si waveguide, and when referring to the entire optical circuit chip, it is referred to as a SiP circuit. Because the Si waveguide has a large refractive index contrast between a core and a cladding, a cross-sectional area of the waveguide and a minimum bending radius can be made significantly smaller than that of optical circuits formed of other materials, which enables high density integrated optical circuits.

In order to actually modularize and make the SiP circuit usable, it is necessary to bundle a plurality of optical fibers for input/output as an optical fiber array and to connect and fix it to an end surface of the optical waveguide of the SiP circuit. FIG. 1 shows a schematic diagram of an optical fiber connection structure in which a SiP circuit and a known optical fiber array are connected.

In FIG. 1, a fiber array 101 is fabricated by aligning a plurality of optical fibers 104 with V-grooves in a V-groove substrate 102 in which a plurality of V-grooves 103 having a V-shaped cross section are formed in parallel at predetermined core intervals in a substrate surface, pressing the plurality of optical fibers 104 from above with a pressing plate 105 and fixing them with an adhesive 106 or the like.

A SiP circuit 107 is an optical circuit optically coupled and connected to the fiber array 101 and has a plurality of Si waveguides 108 near a surface of the SiP circuit as input/output waveguides for transmitting and receiving optical signals in correspondence with the optical fibers 104.

The SiP circuit 107 is bonded to the fiber array 101 with an optical adhesive or the like having a high transmittance for light in a communication wavelength band, and a core end surface of each of the Si waveguides 108 is disposed to be aligned with a core end surface of each of the optical fibers 104 of the fiber array 101 and is optically coupled thereto.

Accuracy required for optical axis alignment at a connection portion between the SiP circuit 107 and the fiber array 101 depends on a mode field diameter (MFD: an index representing the spread of optical power distribution in a cross section of a light beam) of the light at the connection portion. As the MFD becomes smaller, the deterioration of connection loss with respect to the same optical axis misalignment increases, and thus the accuracy requirement becomes more severe.

FIG. 2 is a graph showing an example of a variation in connection loss with respect to an amount of optical axis misalignment between the Si waveguide 108 and the core of the optical fiber 104. A horizontal axis in FIG. 2 is the amount of optical axis misalignment (μm), and a vertical axis is the variation in the connection loss (dB) corresponding to the amount of optical axis misalignment. From FIG. 2, it can be understood that the amount of misalignment has to be 0.28 μm or less to curb the variation in the connection loss to within 0.1 dB.

CITATION LIST

Patent Literature

PTL 1: JP 2001-228345 A

SUMMARY OF THE INVENTION

Technical Problem

However, the present inventors have found that even when the alignment between the core of the optical fiber and the Si waveguide can be performed with high accuracy, there are the following problems.

FIGS. 3(a) and 3(b) are cross-sectional views of a connection portion between a fiber array 101 and a SiP circuit 107 in a known fiber array illustrating the problems when seen from the SiP circuit 107 side in a direction of an optical axis.

In FIG. 3, only one optical fiber 104 is illustrated for simplicity, and a substrate cross-section of the SiP circuit 107 is illustrated on the front side, and the end surface of the fiber array 101 is illustrated on the back side so that they overlap each other as a perspective view. In FIG. 3, note that an adhesive 106 which bonds a pressing plate 105, a V-groove substrate 102, and the optical fiber 104 of the fiber array 101 is filled to a space between the optical fiber 104 and a V-groove 103 below the optical fiber 104.

A two-dot dashed line 301 shows a position of the core in a Si waveguide 108 at a depth in the substrate cross section of the SiP circuit 107, and passes through the position of the core of the optical fiber 104 in a state in which there is no misalignment in FIG. 3(a). The core of the Si waveguide 108 not shown in FIG. 3 coincides with the position of the core of the optical fiber 104 in the state in which there is no misalignment in FIG. 3(a).

In the SiP circuit 107, because the Si waveguide 108 is located at a position very close to a substrate surface of the SiP circuit 107, which is at most within 10 μm, generally about 4 μm, from a substrate surface of the SiP circuit 107, the circuit surface does not reach an upper end of a cross section of a fiber.

Thus, when the fiber array 101 and the SiP circuit 107 are bonded by an optical adhesive 302, a region over which the optical adhesive 302 spreads is within a region 302 indicated by an alternated long and short dash line in FIG. 3. Even considering a fillet portion formed by the optical adhesive 302 protruding out, it is conceivable that the SiP circuit 107 is fixed substantially to the V-groove substrate 102 and is not fixed to a pressing plate 105.

Here, in FIG. 3(b), an effect of thermal expansion of the adhesive 106 in the fiber array 101 when a temperature of the connection portion changes will be described. The SiP circuit 107 is bonded to the V-groove substrate 102 by the optical adhesive 302, and a relative positional relationship between them does not change. Thus, due to expansion of the adhesive 106 in a portion confined between the V-groove 103 of the V-groove substrate 102 and the optical fiber 104, the optical fiber 104 is caused to rise from the V-groove substrate 102, and a misalignment between a core of the optical fiber 104 and a core of the Si waveguide 108 occurs. Thus, unfortunately, connection loss increases.

In FIG. 3(*b*), for example, assuming that an opening angle of the V-groove 103 is 60 degrees and an outer diameter of the optical fiber 104 is 125 μm, a distance from a lower end of the optical fiber to a lower end of the V-groove is exactly equal to a radius of the optical fiber and is 62.5 μm. Assuming that an epoxy-based adhesive is used as the adhesive 106 and a linear expansion rate thereof is $8 \times 10^{-5}$ [$K^{-1}$], a variation in the core position is 0.45 μm for a temperature change from −5 to 85° C. which is a general operating temperature range, that is, a temperature change of 90° C., and this causes a variation in the connection loss of 0.26 dB from FIG. 2 which cannot be ignored.

Cited PTL 1 describes a structure in which a plate-covered glass for polishing reinforcement is adhered onto a silica planar lightwave circuit (PLC) which is an optical circuit containing silica glass as a main component. This is a commonly used structure for silica PLC today, and it is conceivable that this structure not only helps to reinforce during polishing, but also contributes to suppression of the optical axis misalignment because the entire surface of the fiber array including the pressing plate and the optical circuit are adhered to each other.

However, in the case of the SiP circuit 107, a circuit size is several millimeters square which is smaller than that of the silica PLC, and thus it is difficult to bond such a reinforcing glass plate to only a connection portion with the fiber array 101. In addition, in the SiP circuit 107, an electrode for driving a circuit element such as a modulator needs to be exposed on the surface thereof, and thus it is not possible to cover a chip surface with the reinforcing glass plate. In such circumstances, this structure is difficult to be applied to the SiP circuit 107.

In other words, because the SiP circuit 107 has a peculiar circumstance where only the V-groove substrate 102 is bonded and fixed in addition to the connection loss being sensitive to misalignment, the connection loss unfortunately increases and worsens due to the thermal expansion of the adhesive in the V-groove.

The present invention has been made in view of such problems, and an object thereof is to provide an optical fiber array which is optically coupled to a SiP circuit and is capable of suppressing a misalignment between a waveguide and a core of an optical fiber when a temperature varies and reducing temperature dependency of connection loss.

Means for Solving the Problem

Examples of embodiments of the present invention include the following configurations to achieve the above object.

Configuration 1

An optical fiber array including:
a V-groove substrate in which a V-groove for optical fiber alignment is formed;
  a pressing plate laminated and bonded on the V-groove substrate; and
  an optical fiber bonded and fixed in the V-groove of the V-groove substrate,
    wherein a distance d between a lower end of the optical fiber and a bottom of the V-groove is less than 20 μm.

Configuration 2

The optical fiber array of Configuration 1, wherein a half angle θ of an opening angle of the V-groove satisfies $\theta > \sin^{-1}(r/(r+20))$ wherein r is a radius [μm] of the optical fiber.

Configuration 3

The optical fiber array of Configuration 1, wherein
a shape of a bottom of a cross section of the V-groove has a substantially arc-shape, and
a radius of curvature r2 [μm] of the substantially arc-shape satisfies $r1 - 20 \sin \theta/(1-\sin \theta) < r2 \leq r1$ wherein r1 is a radius [μm] of the optical fiber, and θ is a half angle of an opening angle of the V-groove.

Configuration 4

The optical fiber array of Configuration 1, wherein
a shape of a bottom of a cross section of the V-groove has a straight line shape which is horizontal to the V-groove substrate, and
a length w of the straight line shape satisfies $w > 2 \tan \theta \{r(1/\sin \theta - 1) - 20\}$ wherein r is a radius [μm] of the optical fiber, and θ is a half angle of an opening angle of the V-groove.

Configuration 5

A method for forming a V-groove in a V-groove substrate of an optical fiber array, the method including:
  preparing a mold with a protrusion having a cross-sectional shape corresponding to a cross-sectional shape of the V-groove of Configuration 4; and
  performing molding by forming a release film on the mold and applying pressure, by the mold, to glass preform which is heated.

Effects of the Invention

According to the optical fiber array of the present invention described above, it is possible to provide an optical fiber array which is optically coupled to a SiP circuit and is capable of suppressing a misalignment between a waveguide and a core of an optical fiber when a temperature varies and reducing temperature dependency of connection loss.

BRIEF DESCRIPTION OF DRAWINGS

FIG. 3 is a set of cross-sectional views (a) and (b) of a connection portion between the known fiber array and the SiP circuit.

DESCRIPTION OF EMBODIMENTS

Hereinafter, embodiments of the present invention will be described in detail with reference to the drawings.

First, because a misalignment of an optical axis between a Si waveguide and an optical fiber is caused by expansion of an adhesive between the optical fiber and a V-groove, it is necessary to reduce a thickness of the adhesive at the corresponding portion.

Figure 4:
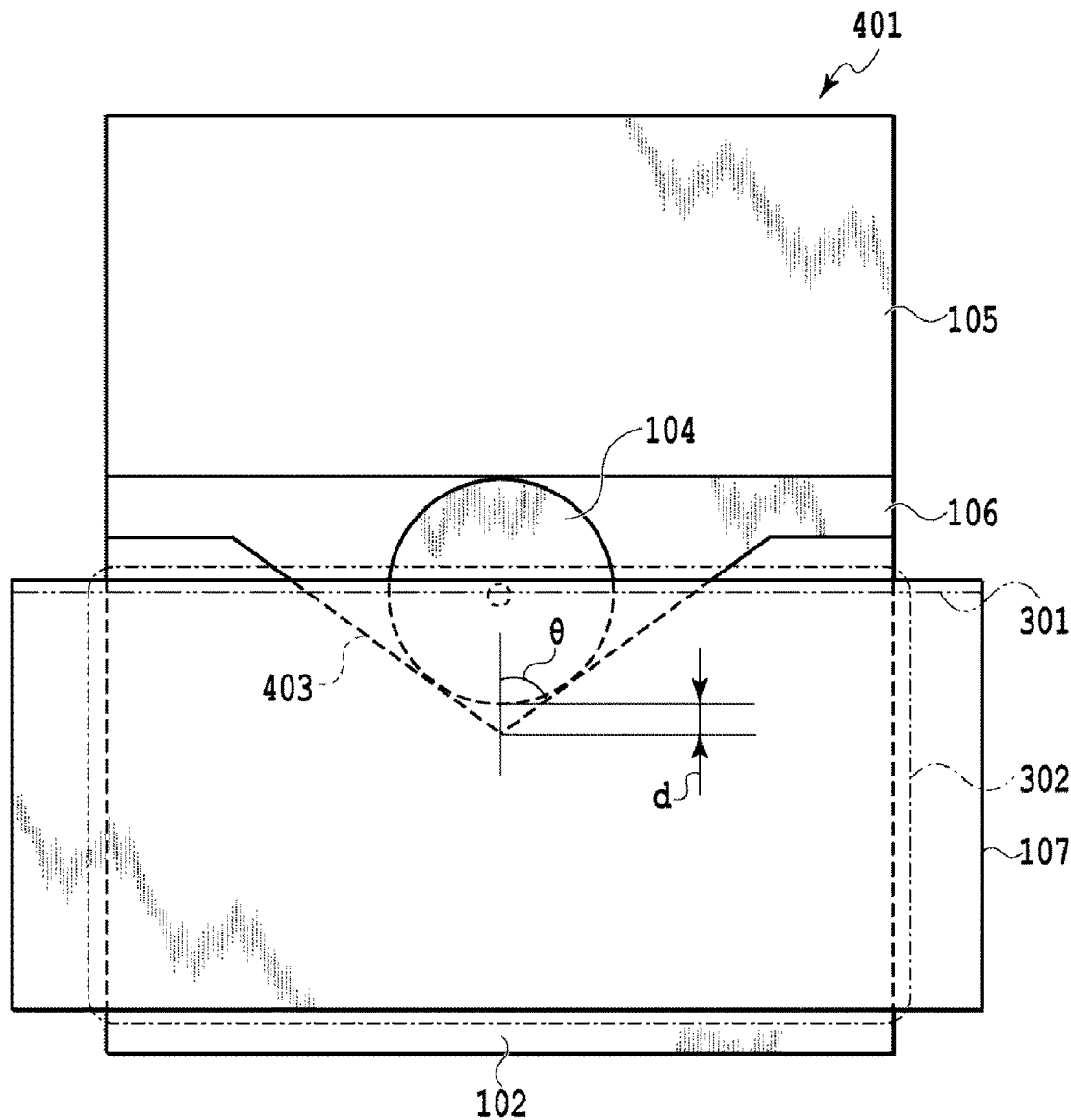
FIG. 4 is a cross-sectional view of a connection portion between a fiber array according to Embodiment 1 and a SiP circuit.
Figure 5:
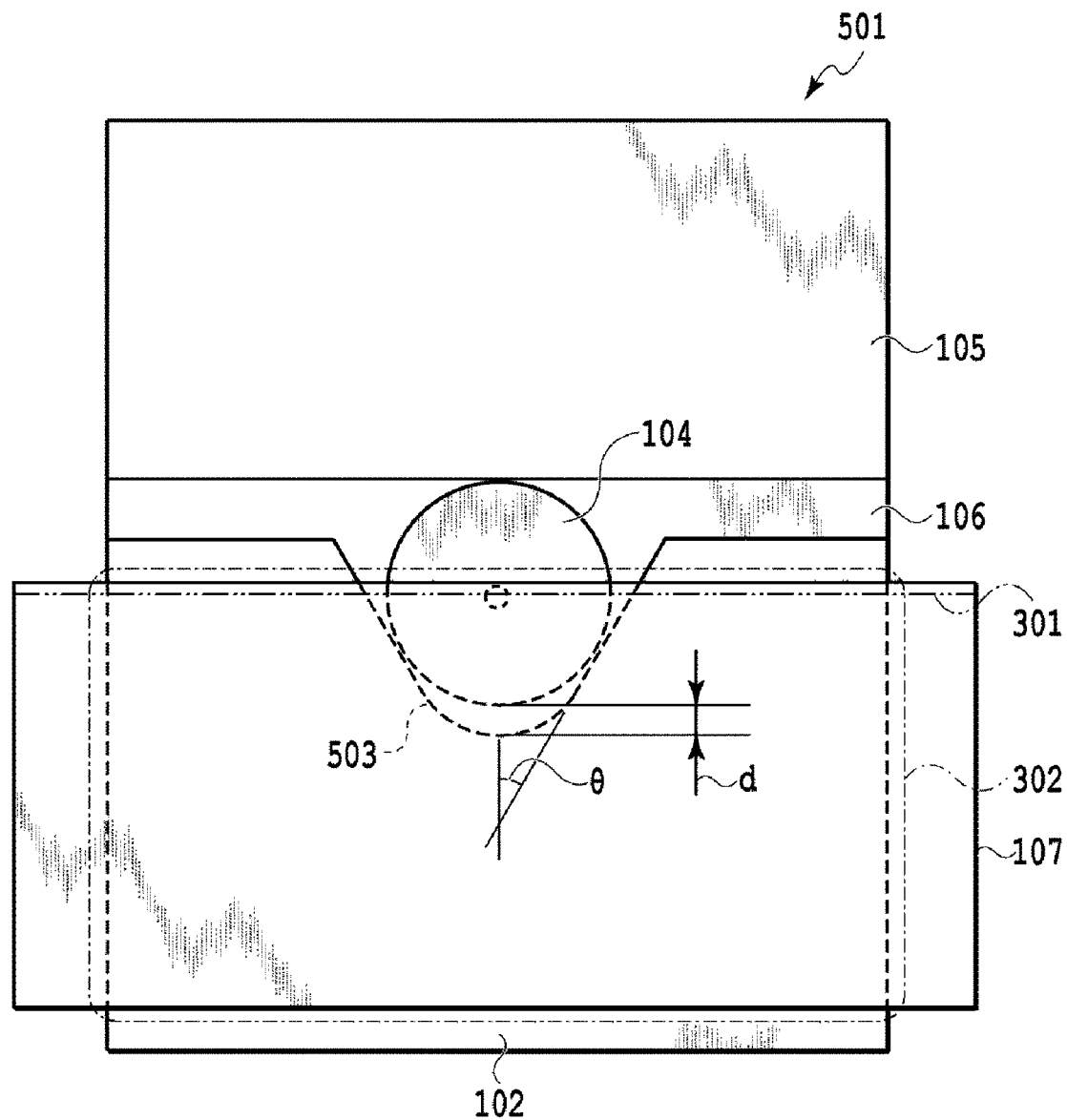
FIG. 5 is a cross-sectional view of a connection portion between a fiber array according to Embodiment 2 and the SiP circuit.
Figure 6:
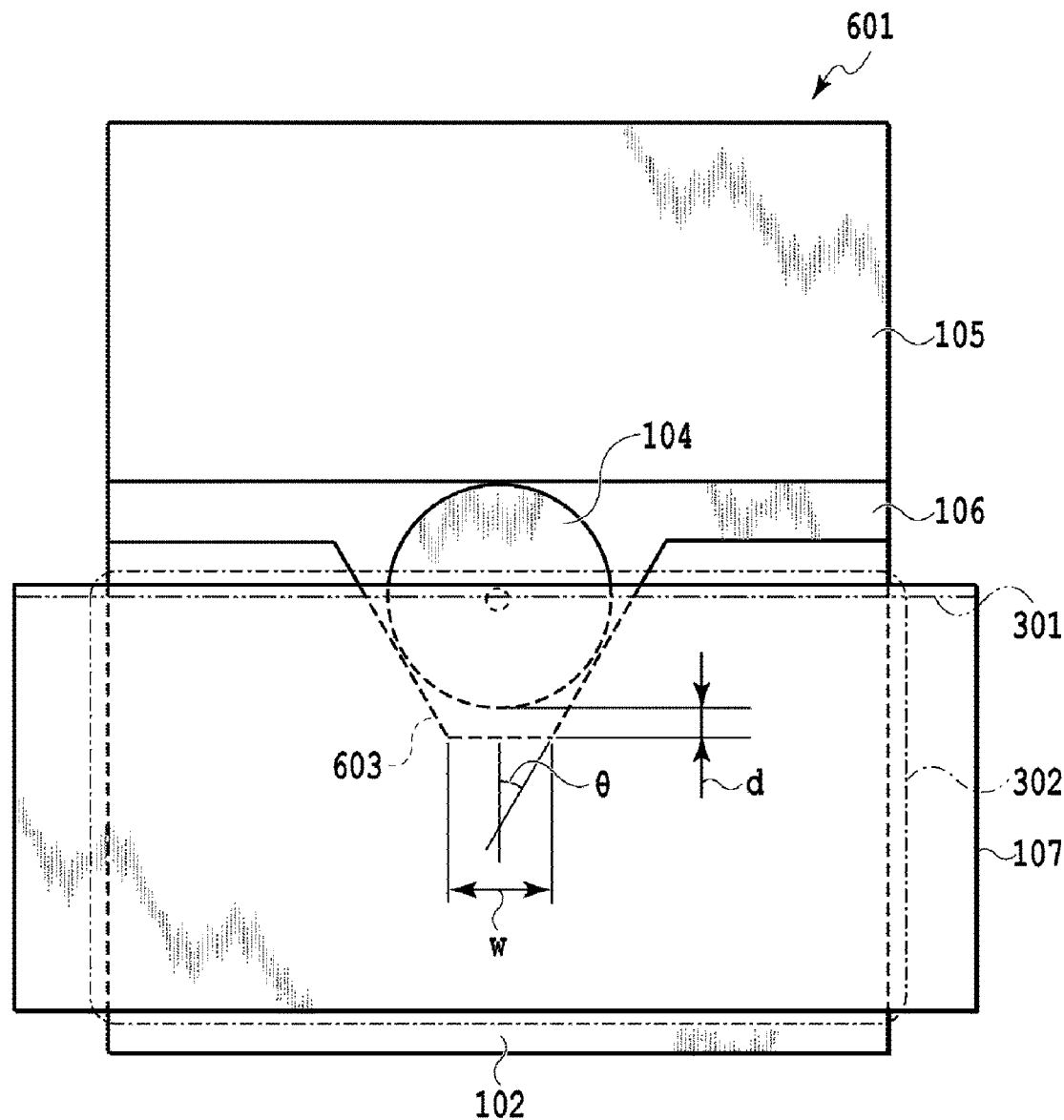
FIG. 6 is a cross-sectional view of a connection portion between a fiber array according to Embodiment 3 and the SiP circuit.

In the following Embodiment 1 to 3, as shown in FIGS. 4 to 6, let d be a distance between a lower end of the optical fiber and a bottom of the V-groove, and let θ be an half angle of an equivalent opening angle of the V-groove. In FIGS. 4 to 6, the structure is basically the same except for a cross-sectional shape of the V-groove.

It is assumed that an operating temperature range to be considered is from −5° C. to 85° C. In addition, because a linear expansion coefficient of the adhesive used when the optical fiber array is assembled is at most $10^{-4}$ [$K^{-1}$], it is preferable that d be less than 20 μm.

Figure 1:
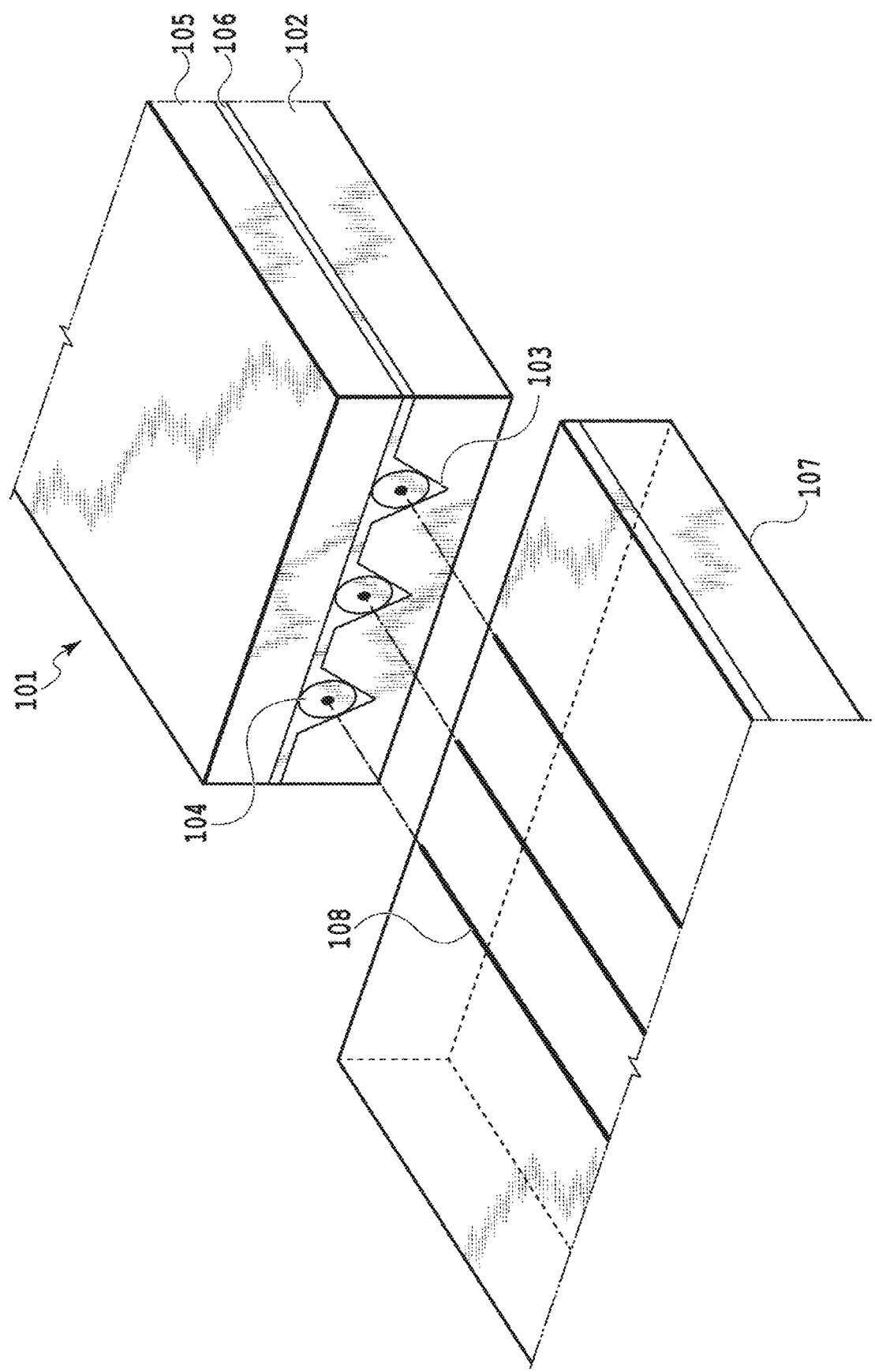
FIG. 1 is a schematic view of an optical fiber connection structure between a known fiber array and a SiP circuit.
Figure 2:
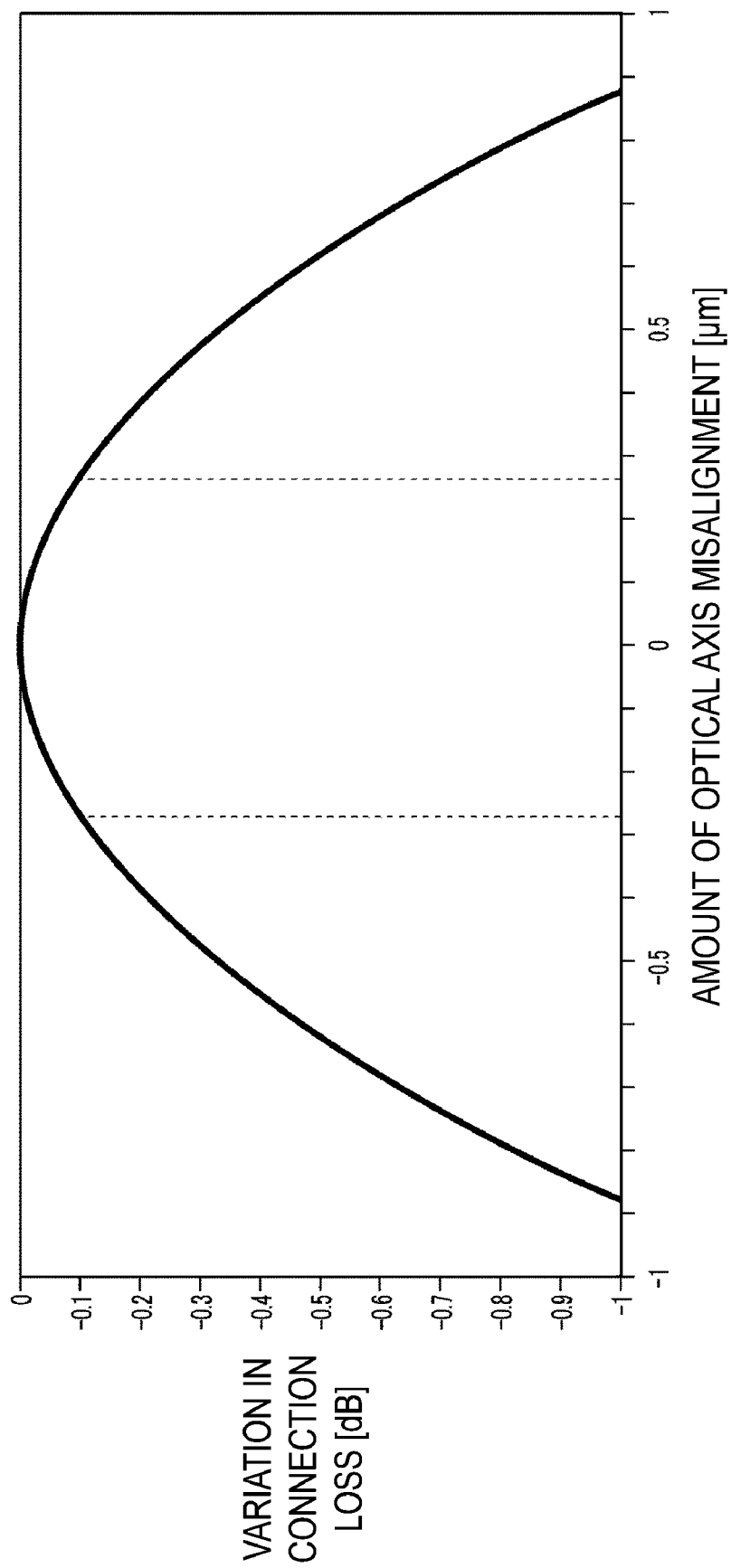
FIG. 2 is a graph showing a variation in connection loss with respect to an amount of misalignment of an optical axis between cores.

In this way, the expansion of the adhesive, that is, a displacement in which the fiber is pushed up is suppressed to less than 0.18 μm at the most, and a variation in the connection loss is less than 0.04 dB from FIG. 2, and the variation in the connection loss is sufficiently suppressed to less than 0.08 dB even in consideration of the two connections for inputting and outputting light to/from a SiP circuit.

Embodiment 1

FIG. 4 is a connection cross-sectional view of a connection portion between a fiber array 401 of Embodiment 1 of the present invention and the SiP circuit 107. In Embodiment 1 of FIG. 4, the opening angle θ of a V-groove 403 is wider than a normal V-groove, and thus the distance d is shorter than that in the example of known art.

As shown in FIG. 4, let θ be the half angle of the opening angle of the V-groove 403 and let r [μm] be the radius of the fiber. When a radius of curvature of a bottom portion of the V-groove is neglected, the following equation is derived from a simple geometric calculation.

$$d = r(1/\sin θ - 1)$$

From a condition of d<20 μm, $$θ > \sin^{-1}(r/(r+20)) \quad \text{Expression (1)}$$

is obtained. This gives a condition of the opening angle of the V-groove 403.

In the case of a fiber with r=62.5 μm, it is required that θ>49.25°, that is, the opening angle is greater than 98.5°.

In this way, the distance d of a portion of the adhesive 106 which is located between the optical fiber 104 and the V-groove 403 on the lower side of the optical fiber 104 can be less than 20 μm, and a fiber array with a sufficiently small temperature variation in the connection loss with respect to the SiP circuit can be obtained.

Embodiment 2

FIG. 5 is a connection cross-sectional view of a connection portion between a fiber array 501 according to Embodiment 2 of the present invention and the SiP circuit 107.

In Embodiment 2 of FIG. 5, the distance d between the lower end of the optical fiber and the bottom of the V-groove 503 is narrowed by rounding a tip end (a bottom) of a cross-sectional shape of the V-groove 503 in a substantially arc shape and increasing the radius of curvature of the tip end. This can be manufactured by grinding the substrate with a blade having a blade shape with a large tip end radius of curvature when the V-groove is formed.

Similarly, let θ be a half of the opening angle of the V-groove 503, and let $r_1$ [μm] be the radius of the optical fiber. When the radius of curvature of the tip end of the V-groove is $r_2$ [μm], d is expressed by the following equation.

$$d = (r_1 - r_2)(1/\sin θ - 1) \quad \text{Expression (2)}$$

From 0 μm<d<20 μm, $$r_1 - 20 \sin θ/(1 - \sin θ) < r_2 ≤ r_1 \quad \text{Expression (3)}$$

is obtained for a condition of $r_2$.

In the case of $r_1$=62.5 μm and θ=30°, the relationship 42.5 μm<$r_2$≤62.5 μm is derived. When a V-groove shape satisfies this condition, a fiber array in which the temperature variation of the connection loss with respect to the SiP circuit is sufficiently small can be obtained.

In particular, when a radius of curvature of the tip end of the V-groove is equal to a radius of the optical fiber 104 ($r_2 = r_1$), a thickness d of the adhesive 106 which causes the optical fiber 104 to rise due to expansion can be minimized.

Embodiment 3

FIG. 6 is a cross-sectional view of a connection portion between a fiber array 601 according to Embodiment 3 of the present invention and the SiP circuit 107.

In Embodiment 3 of FIG. 6, it is assumed that the bottom of the V-groove 603 is a flat surface (a flat bottom), and let w be a width thereof. In other words, in Embodiment 3, it is assumed that a bottom shape of a cross section of the V-groove is a straight line which is horizontal to the substrate, and let w be a length (width). Let θ be a half of the opening angle of the V-groove 603, and let r [μm] be the radius of the optical fiber.

At this time, the following equation is derived.

$$d = r(1/\sin θ - 1) - w/2 \tan θ \quad \text{Expression (4)}$$

From d<20 μm, $$w > 2 \tan θ\{r(1/\sin θ - 1) - 20\} \quad \text{Expression (5)}$$

is obtained for a condition of w.

When r=62.5 μm and θ=30°, the relationship w>49.1 μm is obtained.

When a cross-sectional shape of the V-groove satisfies this condition, a fiber array in which the temperature variation of the connection loss with respect to the SiP circuit is sufficiently small can be obtained.

Steps of Forming V-groove of Embodiment 3

A shape of the V-groove 603 of Embodiment 3 is suitable for producing a V-groove substrate by pressing instead of directly grinding the substrate with a blade to form a V-groove.

Figure 7:
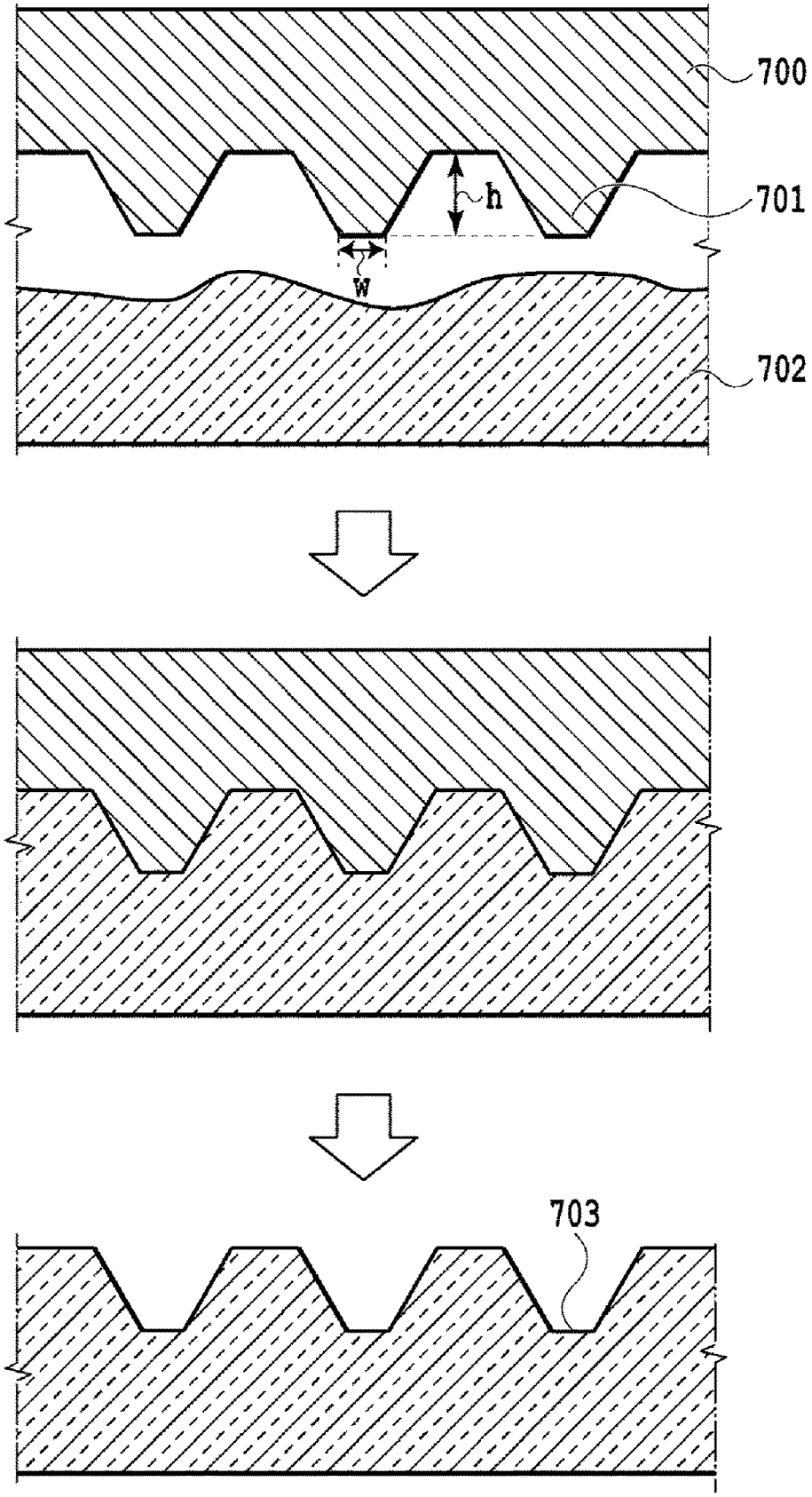
FIG. 7 is a diagram explaining steps of forming a V-groove by pressing in Embodiment 3.

In other words, as shown in the steps of forming the V-groove of Embodiment 3 of FIG. 7, first, a mold 700 with a protrusion 701 having a cross-sectional shape corresponding to the cross-sectional shape of the V-groove is prepared. Because a shape of the protrusion 701 of the mold 700 coincides with a shape of the V-groove 703, a height h of the protrusion 701 is adjusted so that a width w of an upper surface of the protrusion 701 corresponding to a bottom surface of the V-groove satisfies the above-described relationship w>49.1 μm. This can be conveniently and accurately adjusted by polishing a mold surface.

Then, molding is performed using the mold 700. Molding is performed by forming a release film on the mold in advance and then applying pressure, by the mold 700, to glass preform 702 which is heated. After molding, cooling is performed while a pressing force is reduced, and a completed V-groove substrate on which the V-groove 703 is formed is taken out from the mold.

INDUSTRIAL APPLICABILITY

As described above, according to the optical fiber array of the present invention, it is possible to provide an optical fiber array which can suppress a misalignment between a waveguide and a core of an optical fiber when a temperature varies in a SiP circuit, and can reduce temperature dependency of connection loss.

The invention claimed is:

1. An optical fiber connection structure comprising:
   an optical fiber array comprising:
   a V-groove substrate in which a V-groove for optical fiber alignment is formed;
   a pressing plate laminated and bonded on the V-groove substrate; and
   an optical fiber bonded and fixed in the V-groove of the V-groove substrate; and
   an SiP circuit that is bonded to the V-groove substrate by an optical adhesive and is not bonded to the pressing plate,
   wherein a distance d between a lower end of the optical fiber and a bottom of the V-groove is less than 20 μm.

2. The optical fiber connection structure according to claim 1, wherein a half angle θ of an opening angle of the V-groove satisfies $$\theta > \sin^{-1}(r/(r+20))$$

wherein r is a radius [μm] of the optical fiber.

3. The optical fiber connection structure according to claim 1, wherein
   a shape of a bottom of a cross section of the V-groove has a substantially arc-shape, and a radius of curvature r2 [μm] of the substantially arc-shape satisfies $$r1 - 20\sin\theta/(1-\sin\theta) < r2 \leq r1,$$

wherein r1 is a radius [μm] of the optical fiber, and θ is a half angle of an opening angle of the V-groove.

4. The optical fiber connection structure according to claim 1, wherein
   a shape of a bottom of a cross section of the V-groove has a straight line shape which is horizontal to the V-groove substrate, and
   a length w of the straight line shape satisfies $$w > 2\tan\theta\{r(1/\sin\theta - 1) - 20\}$$

wherein r is a radius [μm] of the optical fiber, and θ is a half angle of an opening angle of the V-groove.

* * * * *